(No Model.)
W. H. KNIGHT.
ELECTRIC MOTOR CAR.
No. 377,622. Patented Feb. 7, 1888.
FIG. I.
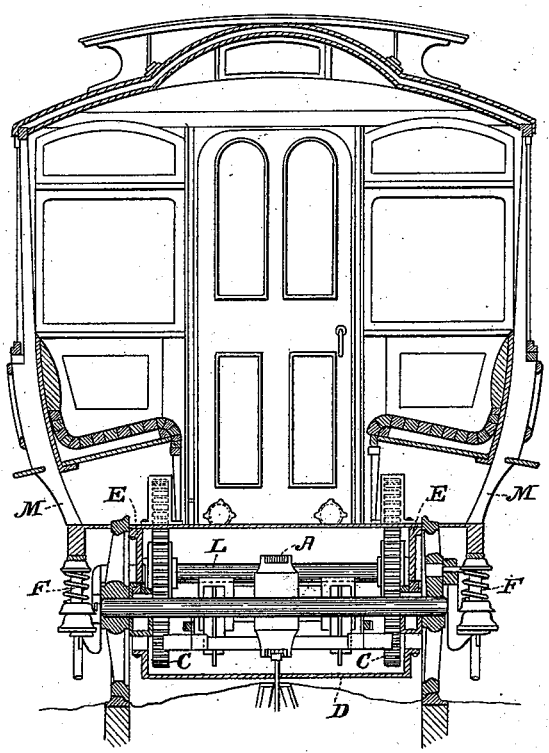
FIG. II.
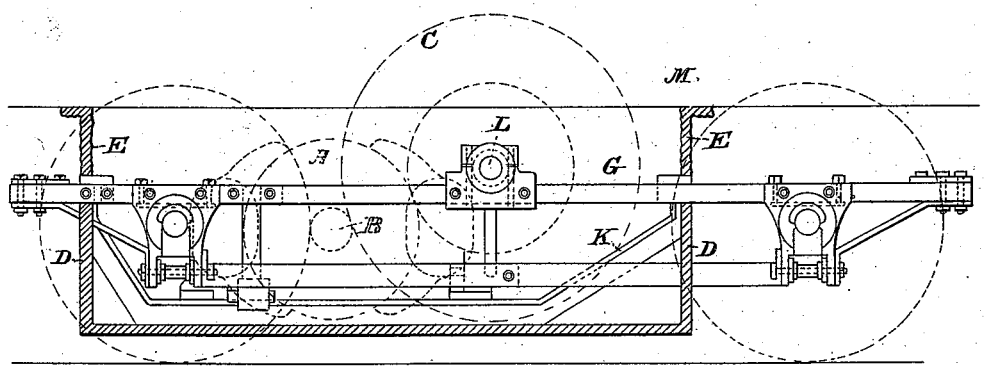
Attest:
Geo. T. Smallwood.
F. A. Hopkins.
Inventor:
Walter H. Knight.
By Knight Bros. attys

UNITED STATES PATENT OFFICE.

WALTER H. KNIGHT, OF NEW YORK, N. Y.

ELECTRIC-MOTOR CAR.

SPECIFICATION forming part of Letters Patent No. 377,622, dated February 7, 1888.

Application filed May 6, 1887. Serial No. 237,382. (No model.)

*To all whom it may concern:*

Be it known that I, WALTER H. KNIGHT, a citizen of the United States, and a resident of the city, county, and State of New York, have invented certain new and useful Improvements in Electric-Motor Cars, of which the following is a specification, reference being made to the accompanying drawings, in which—

Figure 1 is a transverse, and Fig. 2 is a longitudinal, section of a car embodying my invention.

It is a matter of necessity in the operation of mechanism by electric motors that some method of gearing be employed by which the motor may run at a comparatively high rate of speed. When a motor is used on a car, this gearing is a source of great and disagreeable noise, which is only intensified by the resonant metallic boxing usually employed for inclosing the motor and gearing. There are other sources of noise and jar in the motor itself.

My invention consists in employing with a motor on a car an inclosing-case of non-resonant material, like canvas, oil-cloth, or ferflax, by which the noise of the motor and gearing is reduced.

It also consists in a separate truck holding the motor, with a flexible casing between the truck and car-body.

In the accompanying drawings, A is an electric motor supported from an independent truck-frame, G, by hangers K. A pinion, B, on the motor-shaft engages with a gear-wheel, C, on counter-shaft L, and the counter-shaft is connected to the car-axles by parallel rods or similar devices.

The car-body M is supported from the truck-frame by intermediate springs, F.

All the mechanism of the motor-truck is inclosed by a casing, D, of canvas, oil-cloth, ferflax, or similar non-resonant material. I have also found that wood or even metal boxing may be made non-resonant by attaching deadening-strips of rubber, felt, or like material to it.

The casing is continued up to the body of the car by flexible or elastic material E, which will permit the car-body to spring relatively to the truck.

Any novel details of the motor, truck, or conduit shown, but not claimed herein, are reserved for claim in future applications.

What I claim, and desire to secure by Letters Patent, is—

1. The combination, with a vehicle and a propelling electric motor therefor supported therefrom, of a non-resonant casing inclosing the motor.

2. The combination, with a vehicle, of an electric motor thereon, speed-reducing gearing between the motor-shaft and car-axle, and a non-resonant inclosing-case for the motor.

3. The combination of a vehicle, a propelling electric motor supported from the axles, and an inclosing-case for the motor, having an expansible part connected to the spring-supported car-body.

WALTER H. KNIGHT.

Witnesses:
   BENJAMIN L. DENNIS,
   EDWARD M. BENTLEY.